United States Patent
Nguyen

(10) Patent No.: US 9,054,514 B2
(45) Date of Patent: **\*Jun. 9, 2015**

(54) REDUCED LET THROUGH VOLTAGE TRANSIENT PROTECTION OR SUPPRESSION CIRCUIT

(71) Applicant: TRANSTECTOR SYSTEMS, INC., Hayden, ID (US)

(72) Inventor: Eric Nguyen, Hayden, ID (US)

(73) Assignee: Transtector Systems, Inc., Hayden, ID (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/764,652

(22) Filed: Feb. 11, 2013

(65) Prior Publication Data

US 2013/0208387 A1    Aug. 15, 2013

Related U.S. Application Data

(60) Provisional application No. 61/597,589, filed on Feb. 10, 2012.

(51) Int. Cl.
*H02H 9/00* (2006.01)
*H02H 3/02* (2006.01)
*H02H 9/04* (2006.01)

(52) U.S. Cl.
CPC ...... *H02H 3/02* (2013.01); *H02H 9/042* (2013.01)

(58) Field of Classification Search
CPC .................................................. H01L 23/552
USPC ....................................................... 361/118
See application file for complete search history.

(56) References Cited

U.S. PATENT DOCUMENTS

| | | | |
|---|---|---|---|
| 2,030,179 A | 2/1936 | Potter | |
| 3,167,729 A | 1/1965 | Hall | |
| 3,323,083 A | 5/1967 | Ziegler | |
| 3,596,165 A * | 7/1971 | Andrews | 363/19 |
| 3,619,721 A | 11/1971 | Westendorp | |
| 3,663,901 A | 5/1972 | Forney, Jr. | |
| 3,731,234 A | 5/1973 | Collins | |
| 3,750,053 A | 7/1973 | LeDonne | |
| 3,783,178 A | 1/1974 | Philibert | |
| 3,831,110 A | 8/1974 | Eastman | |
| 3,832,627 A | 8/1974 | Ohsawa | |

(Continued)

FOREIGN PATENT DOCUMENTS

| | | |
|---|---|---|
| CH | 675933 | 11/1990 |
| JP | 08-066037 | 3/1996 |

(Continued)

*Primary Examiner* — Stephen W Jackson
(74) *Attorney, Agent, or Firm* — Snell & Wilmer LLP

(57) ABSTRACT

A low let-through voltage surge suppression or protection circuit for protecting hardware or equipment from electrical surges. During operation when no surge condition is present, the circuit allows propagation of signals from a source to a load along a signal path. When a surge is present, the circuit senses and diverts the surge away from the signal path, utilizing common mode and/or differential mode surge protection. An electronic filter is connected in parallel with surge suppression circuit elements for reducing the let through voltage that would otherwise propagate and require a higher power surge suppression circuit element to mitigate. Cascading multiple electronic filters in parallel with surge suppression circuit elements further reduces voltage let through.

20 Claims, 9 Drawing Sheets

(56) References Cited

U.S. PATENT DOCUMENTS

| | | | |
|---|---|---|---|
| 3,845,358 A | 10/1974 | Anderson et al. | |
| 3,921,015 A * | 11/1975 | Obeda et al. | 310/319 |
| 3,944,937 A | 3/1976 | Fujisawa et al. | |
| 3,956,717 A | 5/1976 | Fisher et al. | |
| 3,980,976 A | 9/1976 | Tadama et al. | |
| 4,021,759 A | 5/1977 | Campi | |
| 4,046,451 A | 9/1977 | Juds et al. | |
| 4,047,120 A | 9/1977 | Lord et al. | |
| 4,112,395 A | 9/1978 | Seward | |
| 4,262,317 A | 4/1981 | Baumbach | |
| 4,359,764 A | 11/1982 | Block | |
| 4,384,331 A | 5/1983 | Fukuhara et al. | |
| 4,409,637 A | 10/1983 | Block | |
| 4,481,641 A | 11/1984 | Gable et al. | |
| 4,554,608 A | 11/1985 | Block | |
| 4,563,720 A | 1/1986 | Clark | |
| 4,586,104 A | 4/1986 | Standler | |
| 4,689,713 A | 8/1987 | Hourtane et al. | |
| 4,698,721 A | 10/1987 | Warren | |
| 4,727,350 A | 2/1988 | Ohkubo | |
| 4,901,183 A | 2/1990 | Lee | |
| 4,952,173 A | 8/1990 | Peronnet et al. | |
| 4,984,146 A | 1/1991 | Black et al. | |
| 4,985,800 A | 1/1991 | Feldman et al. | |
| 5,053,910 A | 10/1991 | Goldstein | |
| 5,057,964 A | 10/1991 | Bender et al. | |
| 5,102,818 A | 4/1992 | Paschke et al. | |
| 5,122,921 A | 6/1992 | Koss | |
| 5,124,873 A | 6/1992 | Wheeler | |
| 5,142,429 A | 8/1992 | Jaki | |
| 5,166,855 A | 11/1992 | Turner | |
| 5,278,720 A | 1/1994 | Bird | |
| 5,321,573 A | 6/1994 | Persona et al. | |
| 5,353,189 A | 10/1994 | Tomlinson | |
| 5,442,330 A | 8/1995 | Fuller et al. | |
| 5,534,768 A | 7/1996 | Chavannes et al. | |
| 5,537,044 A | 7/1996 | Stahl | |
| 5,617,284 A | 4/1997 | Paradise | |
| 5,625,521 A | 4/1997 | Luu | |
| 5,667,298 A | 9/1997 | Musil et al. | |
| 5,721,662 A | 2/1998 | Glaser et al. | |
| 5,781,844 A | 7/1998 | Spriester et al. | |
| 5,790,361 A | 8/1998 | Minich | |
| 5,798,790 A | 8/1998 | Knox et al. | |
| 5,844,766 A | 12/1998 | Miglioli et al. | |
| 5,854,730 A | 12/1998 | Mitchell et al. | |
| 5,943,225 A * | 8/1999 | Park | 363/53 |
| 5,953,195 A | 9/1999 | Pagliuca | |
| 5,963,407 A | 10/1999 | Fragapane et al. | |
| 5,966,283 A | 10/1999 | Glaser et al. | |
| 5,982,602 A | 11/1999 | Tellas et al. | |
| 5,986,869 A | 11/1999 | Akdag | |
| 6,031,705 A * | 2/2000 | Gscheidle | 361/111 |
| 6,054,905 A | 4/2000 | Gresko | |
| 6,060,182 A | 5/2000 | Tanaka et al. | |
| 6,061,223 A | 5/2000 | Jones et al. | |
| 6,086,544 A | 7/2000 | Hibner et al. | |
| 6,115,227 A | 9/2000 | Jones et al. | |
| 6,137,352 A | 10/2000 | Germann | |
| 6,141,194 A | 10/2000 | Maier | |
| 6,177,849 B1 | 1/2001 | Barsellotti et al. | |
| 6,226,166 B1 | 5/2001 | Gumley et al. | |
| 6,236,551 B1 | 5/2001 | Jones et al. | |
| 6,243,247 B1 | 6/2001 | Akdag et al. | |
| 6,252,755 B1 | 6/2001 | Willer | |
| 6,281,690 B1 | 8/2001 | Frey | |
| 6,292,344 B1 | 9/2001 | Glaser et al. | |
| 6,342,998 B1 | 1/2002 | Bencivenga et al. | |
| 6,381,283 B1 | 4/2002 | Bhardwaj et al. | |
| 6,385,030 B1 | 5/2002 | Beene | |
| 6,394,122 B1 | 5/2002 | Sibley et al. | |
| 6,421,220 B2 | 7/2002 | Kobsa | |
| 6,502,599 B1 | 1/2003 | Sibley et al. | |
| 6,527,004 B1 | 3/2003 | Sibley et al. | |
| 6,650,203 B2 | 11/2003 | Gerstenberg et al. | |
| 6,721,155 B2 | 4/2004 | Ryman | |
| 6,754,060 B2 | 6/2004 | Kauffman | |
| 6,757,152 B2 | 6/2004 | Galvagni et al. | |
| 6,782,329 B2 | 8/2004 | Scott | |
| 6,785,110 B2 | 8/2004 | Bartel et al. | |
| 6,789,560 B1 | 9/2004 | Sibley et al. | |
| 6,814,100 B1 | 11/2004 | Sibley et al. | |
| 6,816,348 B2 | 11/2004 | Chen et al. | |
| 6,968,852 B1 | 11/2005 | Sibley | |
| 6,975,496 B2 | 12/2005 | Jones et al. | |
| 7,082,022 B2 | 7/2006 | Bishop | |
| 7,092,230 B2 | 8/2006 | Inauen | |
| 7,104,282 B2 | 9/2006 | Hooker et al. | |
| 7,106,572 B1 | 9/2006 | Girard | |
| 7,130,103 B2 | 10/2006 | Murata | |
| 7,159,236 B2 | 1/2007 | Abe et al. | |
| 7,221,550 B2 | 5/2007 | Chang et al. | |
| 7,250,829 B2 | 7/2007 | Namura | |
| 7,338,547 B2 | 3/2008 | Johnson et al. | |
| 7,371,970 B2 | 5/2008 | Flammer et al. | |
| 7,430,103 B2 | 9/2008 | Kato | |
| 7,453,268 B2 | 11/2008 | Lin | |
| 7,623,332 B2 | 11/2009 | Frank et al. | |
| 7,675,726 B2 * | 3/2010 | Bolz et al. | 361/91.1 |
| 7,808,752 B2 | 10/2010 | Richiuso et al. | |
| 2002/0167302 A1 | 11/2002 | Gallavan | |
| 2002/0191360 A1 | 12/2002 | Colombo et al. | |
| 2003/0072121 A1 | 4/2003 | Bartel et al. | |
| 2003/0151870 A1 | 8/2003 | Gronbach et al. | |
| 2003/0179533 A1 | 9/2003 | Jones et al. | |
| 2003/0211782 A1 | 11/2003 | Esparaz et al. | |
| 2004/0042149 A1 | 3/2004 | Devine et al. | |
| 2004/0121648 A1 | 6/2004 | Voros | |
| 2004/0145849 A1 | 7/2004 | Chang et al. | |
| 2004/0264087 A1 | 12/2004 | Bishop | |
| 2005/0036262 A1 | 2/2005 | Siebenthall et al. | |
| 2005/0044858 A1 | 3/2005 | Hooker et al. | |
| 2005/0176275 A1 | 8/2005 | Hoopes et al. | |
| 2005/0185354 A1 | 8/2005 | Hoopes | |
| 2005/0206482 A1 | 9/2005 | DuToit et al. | |
| 2006/0038635 A1 | 2/2006 | Richiuso et al. | |
| 2006/0044076 A1 | 3/2006 | Law | |
| 2006/0082946 A1 | 4/2006 | Duenez et al. | |
| 2006/0120005 A1 | 6/2006 | Van Sickle | |
| 2006/0139832 A1 | 6/2006 | Yates et al. | |
| 2006/0146458 A1 | 7/2006 | Mueller | |
| 2007/0053130 A1 | 3/2007 | Harwath | |
| 2007/0095400 A1 | 5/2007 | Bergquist et al. | |
| 2007/0097583 A1 | 5/2007 | Harwath | |
| 2007/0139850 A1 | 6/2007 | Kamel et al. | |
| 2008/0170346 A1 | 7/2008 | Van Swearingen | |
| 2009/0103226 A1 | 4/2009 | Penwell et al. | |
| 2009/0109584 A1 | 4/2009 | Jones et al. | |
| 2009/0284888 A1 | 11/2009 | Bartel et al. | |
| 2009/0296430 A1 | 12/2009 | Rieux-Lopez et al. | |
| 2011/0080683 A1 | 4/2011 | Jones et al. | |
| 2011/0141646 A1 | 6/2011 | Jones et al. | |
| 2011/0159727 A1 | 6/2011 | Howard et al. | |
| 2011/0279943 A1 | 11/2011 | Penwell et al. | |

FOREIGN PATENT DOCUMENTS

| | | |
|---|---|---|
| JP | 11-037400 | 2/1999 |
| JP | 2003-070156 | 3/2003 |
| JP | 2003-111270 | 4/2003 |
| KR | 10-2003-0081041 | 10/2003 |
| KR | 1020090018497 | 2/2009 |
| WO | WO 95/10116 | 4/1995 |
| WO | WO 2011-119723 | 12/2011 |

* cited by examiner

REDUCED LET THROUGH VOLTAGE TRANSIENT PROTECTION OR SUPPRESSION CIRCUIT

CROSS REFERENCE TO RELATED APPLICATIONS

This application claims the benefit and priority of U.S. Provisional Application No. 61/597,589, entitled Reduced Let Through Voltage Transient Protection or Suppression Circuit, filed on Feb. 10, 2012, the entire contents of which are hereby incorporated by reference herein.

BACKGROUND

1. Field

The present disclosure relates generally to surge protection circuits and improvements thereof. More particularly, the present disclosure relates to surge protection circuits with reduced voltage let through and improvements thereof.

2. Description of the Related Art

Communications equipment, computers, home stereo amplifiers, televisions and other electronic devices are increasingly manufactured using a variety of electronic components that are vulnerable to damage from electrical energy surges. Surge variations in power and transmission line voltages, as well as noise, can change the operating frequency range of connected equipment and severely damage or destroy electronic devices. Electronic devices impacted by these surge conditions can be very expensive to repair or replace. Therefore, a cost effective way to protect these devices and components from power surges is needed.

Surge protectors help defend electronic equipment from damage due to the large variations in the current and voltage resulting from lightning strikes, switching surges, transients, noise, incorrect connections or other abnormal conditions or malfunctions that travel across power or transmission lines. As the number of electronic systems and equipment increase through both commercial and industrial society, the need for adequate and efficient protection from power surges becomes ever more important. A malfunctioning system or piece of equipment due to an unexpected or unintended surge of electrical power runs the risk of extensive monetary damage to the system or equipment and can even impact human safety. In an effort to reduce these risks, protection circuits or devices have been incorporated as part of or connectible to electrical systems or equipment in order to prevent the propagation of power surges through the electronics or other electrical equipment.

Circuit elements such as silicon avalanche diodes (SADs), metal oxide varistors (MOVs), Gas Discharge Tubes (GDTs) and other non-linear circuit components have been used for diverting a surge above a predetermined threshold from a signal line. However, conventional protection circuits can be extremely costly as the power dissipation requirements for a given system increase. Such components can be prohibitively expensive for many applications, particularly when the components must be capable of withstanding significant amounts of voltage and current upon conduction of an overcurrent or overvoltage. Conventional avalanche suppressors produce significant noise and glitches during the avalanche process before reaching a full conduction mode which can upset or damage sensitive protected equipment. Conventional GDT technologies are slow in response time due to the gas ionization/excitation process that is required in order for the energy discharge to occur, and thus they can allow very high let through voltages to propagate to the protected equipment. Similarly, conventional MOV technologies have high parasitic inductances and capacitances in the package causing the slow response time. This let through voltage can be extremely harmful to equipment if left unmitigated and adds additional expense to surge protection circuitry since higher rated surge components must be utilized.

Therefore, a surge protection system or circuit is desirable that can reduce the let through voltage to a minimal level when compared to conventional circuit protection technologies and thereby provide a lower clamping voltage with better filtering of surge signals in order to efficiently prevent the propagation of overvoltages or overcurrents to protected systems or hardware. The surge protection system or circuit would also desirably reduce the cost of such protection circuitry due to the reduction of the let through voltage remnant. In addition, the surge protection system or circuit would desirably be capable of easy scalability to a variety of surge protection or suppression power requirements or filtering needs.

SUMMARY

An apparatus and method for protecting against a surge condition in an electric circuit by conducting the surge along a signal pathway and reducing the let through voltage that propagates through the remainder of the circuit due to the surge condition. The surge protection apparatus may provide a lower clamping voltage and a better filter for various transient threats. In one implementation, a low let-through voltage surge suppression or protection apparatus may include a housing defining a cavity therein, a first signal port connected to the housing, a second signal port connected to the housing and a ground connection connected to the housing. A first surge protection filtering device is electrically connected between the first signal port and the second signal port for reducing a let through voltage, the first surge protection filtering device including a first silicon avalanche diode, a first capacitor connected to the first silicon avalanche diode and a first resistor connected to the first silicon avalanche diode and the first capacitor. A first surge element is electrically connected between the first signal port and the second signal port in parallel with the first surge protection filtering device. A second surge protection filtering device is electrically connected between the first signal port and the ground connection for reducing a let through voltage, the second surge protection filtering device including a second silicon avalanche diode, a second capacitor connected to the second silicon avalanche diode and a second resistor connected to the second silicon avalanche diode and the second capacitor. A second surge element is electrically connected between the first signal port and the ground connection in parallel with the second surge protection filtering device. A third surge protection filtering device is electrically connected between the second signal port and the ground connection for reducing a let through voltage, the third surge protection filtering device including a third silicon avalanche diode, a third capacitor connected to the third silicon avalanche diode and a third resistor connected to the third silicon avalanche diode and the third capacitor. A third surge element is electrically connected between the second signal port and the ground connection in parallel with the third surge protection filtering device.

In another implementation, a low let-through voltage surge suppression or protection apparatus may include a housing defining a cavity therein, a first input port connected to the housing, a second input port connected to the housing, a first output port connected to the housing, a second output port connected to the housing, a first inductor electrically connected between the first input port and the first output port, a second inductor electrically connected between the second input port and the second output port and a ground port connected to the housing. A first surge protection filtering device is electrically connected between the first input port and the second input port for reducing a let through voltage and a first surge element is electrically connected between the first input port and the second input port in parallel with the first surge protection filtering device. A second surge protection filtering device is electrically connected between the first input port and the ground port for reducing a let through voltage and a second surge element is electrically connected between the first input port and the ground port in parallel with the second surge protection filtering device. A third surge protection filtering device is electrically connected between the first output port and the ground port for reducing a let through voltage and a third surge element is electrically connected between the first output port and the ground port in parallel with the third surge protection filtering device. A fourth surge protection filtering device is electrically connected between the second input port and the ground port for reducing a let through voltage and a fourth surge element is electrically connected between the second input port and the ground port in parallel with the fourth surge protection filtering device. A fifth surge protection filtering device is electrically connected between the second output port and the ground port for reducing a let through voltage and a fifth surge element is electrically connected between the second output port and the ground port in parallel with the fifth surge protection filtering device. A sixth surge protection filtering device is electrically connected between the first output port and the second output port for reducing a let through voltage and a sixth surge element is electrically connected between the first output port and the second output port in parallel with the sixth surge protection filtering device.

BRIEF DESCRIPTION OF THE DRAWINGS

Other systems, methods, features, and advantages of the present disclosure will be or will become apparent to one with skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

DETAILED DESCRIPTION

Figure 1:
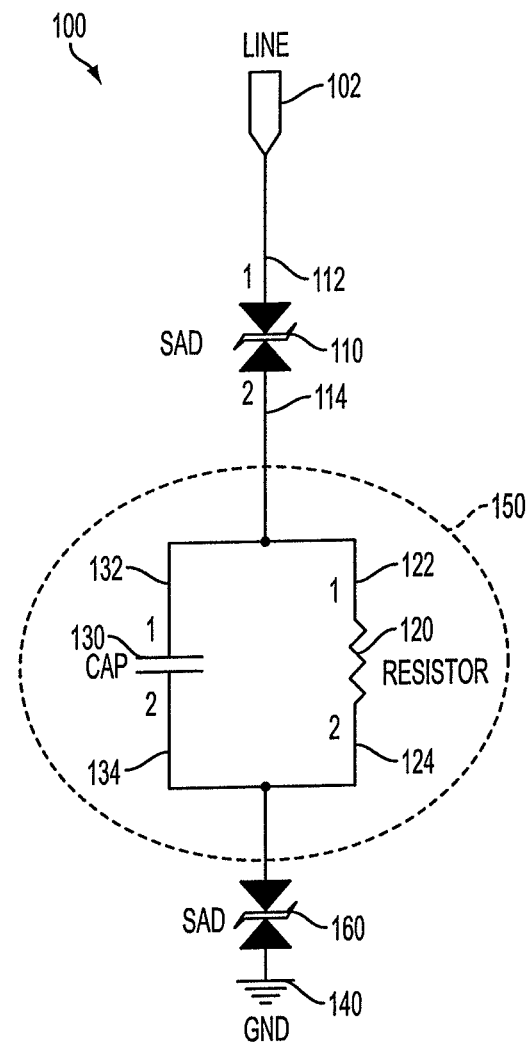
FIG. 1 is a schematic circuit diagram of an advanced transient avalanche charger (ATAC) filter as a parallel element for dissipating a surge in an electric circuit in accordance with an embodiment of the present invention.

Referring to FIG. 1, a schematic circuit diagram of an advanced transient avalanche charger (ATAC) filter 100 is shown. The ATAC filter 100 operates to reduce the let through voltage when encountering a surge condition, especially when compared to traditional or conventional surge suppression or protection techniques connected in parallel. The ATAC filter 100 is a time domain notch filter and includes a silicon avalanche diode (SAD) 110, and a Resistor-Capacitor (RC) circuit 160. The SAD 110 has a first terminal 112 and a second terminal 114. The RC circuit 160 includes a resistor 120 and a capacitor 130. The resistor 120 has a first terminal 122 and a second terminal 124. The capacitor 130 also has a first terminal 132 and a second terminal 134. In FIG. 1, the RC circuit 160 is a parallel RC circuit, having the resistor 120 and the capacitor 130 connected in parallel.

The ATAC filter 100 is formed by a series combination of the SAD 110 with the RC circuit 150, as shown. In other words, the second terminal 114 of the SAD 110 is electrically connected to the first terminal 122 of the resistor 120 and the first terminal 132 of the capacitor 130. The second terminal 124 of the resistor 120 is electrically connected to the second terminal 134 of the capacitor 130. The first terminal 112 of the SAD 110 may be electrically connected to a signal line 102 or other form of input port and the second terminals (124, 134) of the resistor and capacitor, respectively, may be electrically connected to a ground 140 through a second SAD 160. Thus, upon encountering a surge present on the signal line 102, at least a portion of the surge voltage or current is dissipated through the ATAC filter 100 to ground 140 with reduced let through energy, thereby aiding in the protection of any electrical systems or equipment that may be connected to the ATAC filter 100 along the signal line 102.

The ATAC filter 100 significantly reduces the let through voltage and associated current (e.g., by half) of a surge propagating on the signal line 102 when compared to conventional surge protection elements or schemes and provides a low clamping voltage in order to more efficiently protect any sensitive connected equipment from all types of transient threats. When a surge is introduced along the signal line 102 to which the ATAC filter 100 is connected, the SAD 110 begins to conduct in order to divert at least some of the surge voltage and/or current off of the signal line 102 to the ground 140.

In a conventional surge protection circuit utilizing conventional surge diversion elements, the let through voltage of such surge diversion elements would continue to propagate along the signal line 102 and potentially cause damage to any connected electrical systems or equipment. The ATAC filter 100 is capable of quickly diverting more current to ground 140 and with less high frequency noise due to the resistor 120 and capacitor 130 connections. Thus, the ATAC filter 100 quickly chops out the surge current by building it across the capacitor 130 instead of permitting remnants to flow along the signal line 102. Subsequent surge elements in parallel may thus encounter lower surge energy levels and thus have lower power ratings than might otherwise be necessary.

After the surge event, the capacitor 130 may be charged to its full potential. The resistor 120 acts as a bleeding resistor to safely discharge the capacitor 130 without propagating the surge current into the signal line 102.

A second SAD 160 is connected in series between the RC circuit 150 and the ground 140. The second SAD 160 functions similar to the SAD 110 to provide protection against bidirectional surge events.

In an alternative implementation, different surge diverting or protection elements (e.g., metal oxide varistors (MOVs), gas discharge tubes (GDTs), etc.) may be used in place of or in addition to the SADs 110 and/or 160 of the ATAC filter 100 to provide varying surge suppression characteristics for a desired design. Because the ATAC filter 100 utilizes the protection elements connected in series, the protection elements can be configured or customized for a desired let-through voltage level. Furthermore, for systems or equipment that require higher surge current handling or lower voltage clamping, a plurality of ATAC filters 100 can be cascaded in parallel with each other. Each cascaded ATAC filter 100 stage thus reduces the let through energy further from the previous ATAC filter 100 stage. In this manner, less expensive surge protection elements may be utilized in a given surge protection circuit since the let through voltage is significantly reduced. Such a configuration may permit surge protection on previously prohibitively expensive systems that might encounter very high power surges.

Figure 2A:
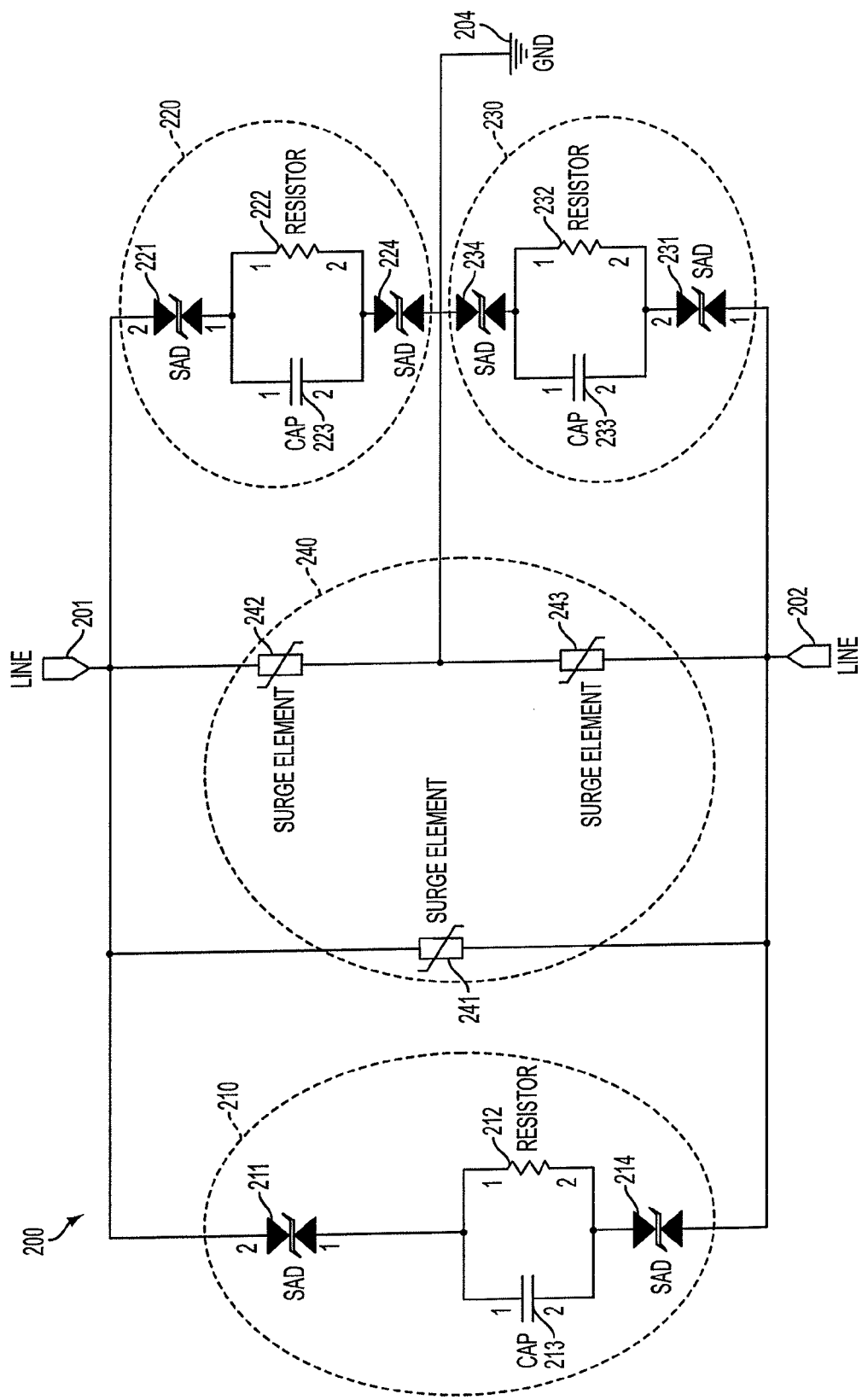
FIG. 2A is a schematic circuit diagram of a surge protection circuit utilizing a plurality of ATAC filters of FIG. 1 in accordance with an embodiment of the present invention.

Turning next to FIG. 2A, a surge protection circuit 200 is shown utilizing a plurality of ATAC filters which may be the same or similar to the ATAC filter previously described for FIG. 1. The surge protection circuit 200 operates to protect any connected electrical equipment from a surge condition sensed by the surge protection circuit 200. The surge protection circuit 200 includes a first signal port 201, a second signal port 202 and a ground connection 204. The first signal port 201 and the second signal port 202 may be connected in a parallel configuration with an electrical system so that the electrical system is protected from a surge condition present upon a signal line connected to either the first signal port 201 or the second signal port 202. Thus, upon the presence of a surge at either the first signal port 201 or the second signal port 202, a number of different electrical components, such as capacitors, resistors, diodes, and surge elements operate to aid in preventing the propagation of such a surge from continuing along the signal lines to cause damage to the connected system, as described in more detail herein. For illustrative purposes, the surge protection circuit 200 will be described with reference to such capacitor, resistor, diode and surge elements, but it is not required that the exact circuit elements described be used in the present disclosure. Thus, the capacitors, resistors, diodes and surge elements are merely used to illustrate an implementation of the disclosure and not to limit the present disclosure.

The surge protection circuit 200 may be implemented as a surge protection or suppression device. In one implementation, the surge protection circuit 200 may be formed as part of or included within a housing or other enclosure for allowing a user to physically connect the surge protection or suppression device to a system of the user. The enclosure may have a cavity contained or formed therein for placement of the various circuit elements of the surge protection circuit 200, either connected to a printed circuit board secured within the cavity or otherwise fastened within the enclosure. The first and second signal ports (201, 202) may be configured to mate or otherwise interface with signal carrying conductors, for example, coaxial cables.

By electrically connecting the surge protection circuit 200 in parallel with a system to be protected, an electrical surge that could otherwise damage or destroy the connected system will instead be dissipated through the surge protection circuit 200, as discussed in greater detail herein. The surge protection circuit 200 incorporates both common mode and differential mode surge protection between the first signal port 201, the second signal port 202 and the ground connection 204. The ground connection 204 may be a signal line configured to be connected to an exterior ground via a connector port or may be incorporated as part of an exterior housing of a surge protection device incorporating the surge protection circuit 200.

Turning more specifically to the various components used in the surge protection circuit 200, three ATAC filters (210, 220, 230) are provided. The first ATAC filter 210 is electrically connected between the first signal port 201 and the second signal port 202. The first ATAC filter includes a first SAD 211, a second SAD 214, and a first resistor 212 connected in parallel with a first capacitor 213. The second ATAC filter 220 is electrically connected between the first signal port 201 and the ground connection 204. The second ATAC filter 220 includes a third SAD 221, a fourth SAD 224, and a second resistor 222 connected in parallel with a second capacitor 223. The third ATAC filter 230 is electrically connected between the second signal port 202 and the ground connection 204. The third ATAC filter 230 includes a fifth SAD 231, a sixth SAD 234, and a third resistor 232 connected in parallel with a third capacitor 233.

The surge protection circuit 200 also includes a set 240 of surge elements for dissipating a surge present at either the first signal port 201 or the second signal port 202. A first surge element 241 is electrically connected between the first signal port 201 and the second signal port 202, in parallel with the first ATAC filter 210. A second surge element 242 is electrically connected between the first signal port 201 and the ground connection 204, in parallel with the second ATAC filter 220. A third surge element 243 is electrically connected between the second signal port 202 and the ground connection 204, in parallel with the third ATAC filter 230. Thus, the ATAC filters (210, 220, 230) operate to substantially reduce the let through voltage of a surge condition at the first signal port 201 or the second signal port 202 and coordinate with the surge element (241, 242, 243) in parallel therewith to efficiently dissipate a surge before it can encounter any connected systems or equipment.

Each of the surge elements (241, 242, 243) may be any of a variety of surge diverting or conducting components, such as SADs, MOVs, GDTs, or other non-linear circuit elements. Different surge elements may provide varying surge dissipation characteristics. The inclusion of the ATAC filters (210, 220, 230) in parallel with the surge elements (241, 242, 243) reduces the let-through energy seen by the surge elements (241, 242, 243), thus permitting lower rated and potentially fewer surge elements to be needed for a given circuit. In an alternative implementation, additional ATAC filters may be provided in parallel with any of the first ATAC filter 210, the second ATAC filter 220 or the third ATAC filter 230 to further reduce the let through voltage. Such additional ATAC filters further reduce the let through surge energy for further surge reduction and cost savings. For example, a 10 kA surge may require 20 k Watts worth of silicon in a single SAD surge element to appropriately divert the surge. By cascading one or more ATAC filters in parallel, a SAD surge element with lower power requirements may be used or utilized at a cheaper cost.

Figure 2B:
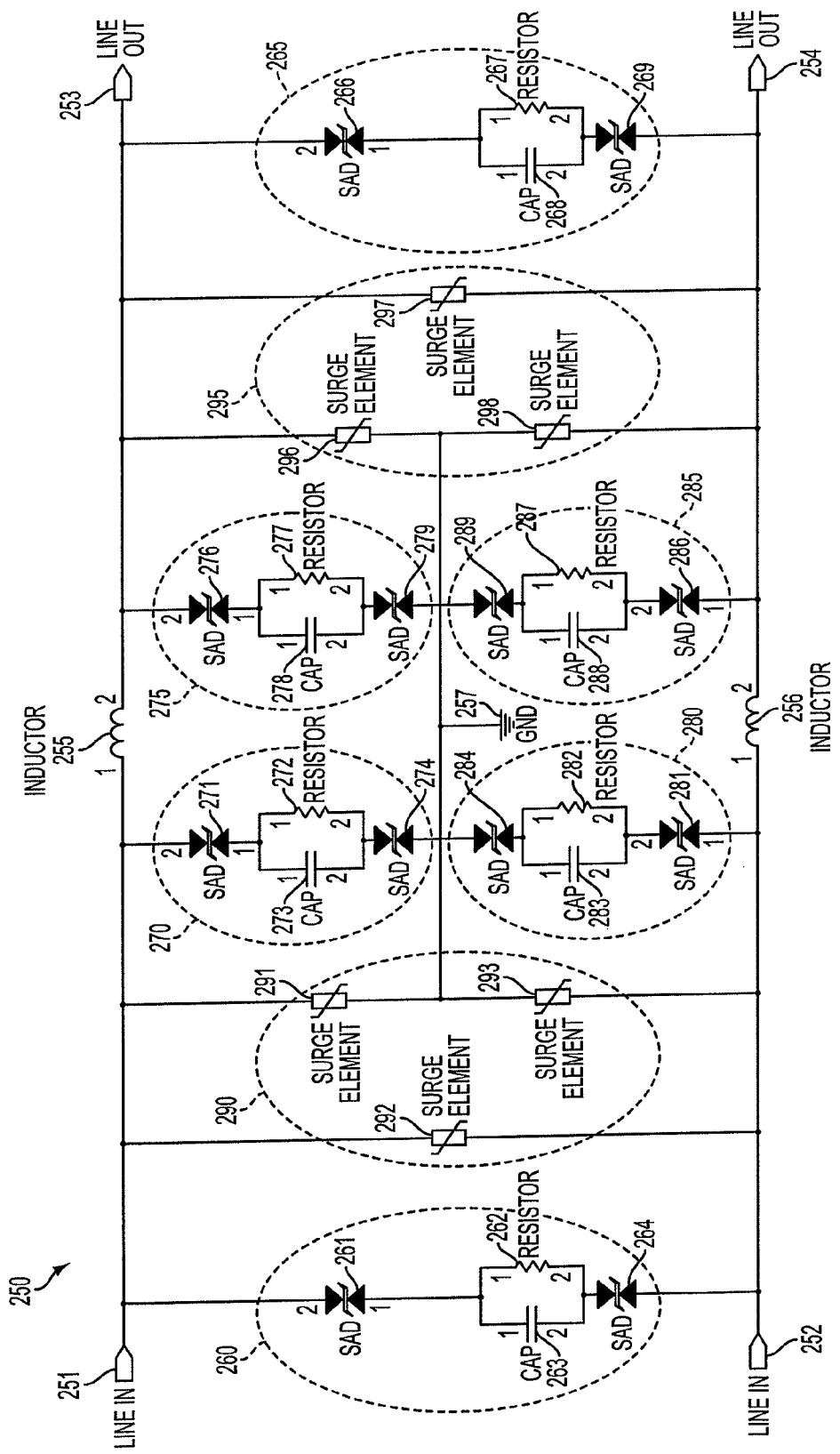
FIG. 2B is a schematic circuit diagram of a two port network surge protection circuit utilizing a plurality of ATAC filters of FIG. 1 in accordance with an embodiment of the present invention.

Turning next to FIG. 2B, a two-port network surge protection circuit 250 is shown utilizing a plurality of ATAC filters, which may be the same or similar to the ATAC filter previously described for FIG. 1. Generally, the surge protection circuit 250 may have certain structure and functional features that are similar to those of the surge protection circuit 200, previously described for FIG. 2A. Notwithstanding these similar features, the surge protection circuit 250 may be distinguished from the surge protection circuit 200 based primarily on its dual-port or differential configuration.

The surge protection circuit 250 includes a first input port 251, a first output port 253, a second input port 252 and a second output port 254. In certain implementations, the surge protection circuit 250 may operate bi-directionally such that the input ports may act as output ports or vice versa. The surge protection circuit 250 operates to protect any connected electrical equipment connected at either the first output port 253 or the second output port 254 from a surge condition present at either the first input port 251 or the second input port 252. Similarly, a surge at the first output port 253 or the second output port 254 may also be prevented from transmitting to any power supplies or other equipment connected at the first input port 251 or the second input port 252. Instead, a surge sensed by the surge protection circuit 250 is diverted through a variety of electrical components, such as capacitors, resistors, diodes and other surge elements that operate to divert the surge before it can disrupt or cause damage any connected equipment, as discussed in greater detail herein. For illustrative purposes, the surge protection circuit 250 will be described with reference to such capacitors, resistors, diodes and surge elements, but it is not required that the exact circuit elements described be used in the present disclosure. Thus, the capacitors, resistors, diodes and surge elements are merely used to illustrate an implementation of the disclosure and not to limit the present disclosure.

Similar to the surge protection circuit 200, the surge protection circuit 250 may also be implemented as a surge protection or suppression device including a housing or other enclosure for containing one or more electrical components mounted therein. The various electrical components may be mounted to the housing itself within a cavity of the housing or may be connected to a printed circuit board disposed within the cavity or otherwise secured with the housing. The input and output ports (251, 252, 253, 254) are connected to various electrical components and are configured to mate or otherwise interface with signal carrying conductors to facilitate connection with a user's system.

The surge protection circuit 250 includes a first inductor 255 connected along a signal pathway between the first input port 251 to the first output port 253. Similarly, a second inductor 256 is connected along a signal pathway from the second input port 252 to the second output port 254. The inductors (255, 256) help maintain isolation of the input ports (251, 252) from the output ports (253, 254) for surge signals that should instead desirably be conducted via various ATAC filters or surge elements, as described in greater detail herein. In addition, because the portion of the circuit to the left of the inductors (255, 256) (i.e., a first stage) is independent from the portion of the circuit to the right of the inductors (i.e., a second stage), the two stages of the surge protection circuit 250 can be coordinated for any given electrical application to control the clamping voltage during a surge event to a level that is nominally above, but very close to, the operating voltage of the electrical application.

The surge protection circuit 250 incorporates both common mode and differential mode surge protection between the first input port 251, the second input port 252, the first output port 253, the second output port 254 and a ground or return connection 257. The ground or return connection 257 may be a signal line configured to be connected to an exterior ground via a connection port connected to a housing or may be incorporated as part of an exterior housing of a surge protection device incorporating the surge protection circuit 250.

Turning more specifically to the various components used in the surge protection circuit 250, six ATAC filters (260, 265, 270, 275, 280, 285) are provided. The first two ATAC filters (260, 265) are provided between input and output ports, as described below. The first ATAC filter 260 is electrically connected between the first input port 251 and the second input port 252. The first ATAC filter includes a first SAD 261, a second SAD 264, a first resistor 262, and a first capacitor 263. The second ATAC filter 265 is electrically connected between the first output port 253 and the second output port 254. The second ATAC filter 265 includes a third SAD 266, a fourth SAD 269, and a second resistor 267, and a second capacitor 268.

The remaining four ATAC filters (270, 275, 280, 285) are provided between either input or output ports and ground, as described below. The third ATAC filter 270 is electrically connected between the first input port 251 and the ground connection 257. The third ATAC filter 270 includes a fifth SAD 271, a sixth SAD 274, a third resistor 272, and a third capacitor 273. The fourth ATAC filter 275 is electrically connected between the first output port 253 and the ground connection 257. The fourth ATAC filter 275 includes a seventh SAD 276, an eighth SAD 279, a fourth resistor 277, and a fourth capacitor 278. The fifth ATAC filter 280 is electrically connected between the second input port 252 and the ground connection 257. The fifth ATAC filter 280 includes a ninth SAD 281, a tenth SAD 284, a fifth resistor 282, and a fifth capacitor 283. The sixth ATAC filter 285 is electrically connected between the second output port 254 and the ground connection 257. The sixth ATAC filter 285 includes a eleventh SAD 286, a twelfth SAD 289, a sixth resistor 287, and a sixth capacitor 288.

The surge protection circuit 250 also includes two sets (290, 295) of surge elements for dissipating a surge present at any of the first input port 251, the second input port 252, the first output port 253 or the second output port 254. A first surge element 292 is electrically connected between the first input port 251 and the second input port 252, in parallel with the first ATAC filter 260. A second surge element 297 is electrically connected between the first output port 253 and the second output port 254, in parallel with the second ATAC filter 265. A third surge element 291 is electrically connected between the first input port 251 and the ground connection 257, in parallel with the third ATAC filter 270. A fourth surge element 296 is electrically connected between the first output port 253 and the ground connection 257, in parallel with the fourth ATAC filter 275. A fifth surge element 293 is electrically connected between the second input port 252 and the ground connection 257, in parallel with the fifth ATAC filter 280. A sixth surge element 298 is electrically connected between the second output port 254 and the ground connection 257, in parallel with the sixth ATAC filter 285. Thus, the ATAC filters (260, 265, 270, 275, 280, 285) operate to substantially reduce the let through voltage of a surge condition at the first input port 251, the second input port 252, the first output port 253 or the second output port 254 and coordinate with the surge element (291, 292, 293, 294, 295, 296, 297, 298) in parallel therewith to efficiently dissipate a surge.

Each of the surge elements (291, 292, 293, 294, 295, 296, 297, 298) may be any of a variety of surge diverting or conducting components, such as SADs, MOVs, GDTs, or other non-linear circuit elements. Different surge elements may provide varying surge dissipation characteristics. In an alternative implementation, one or more of the sets (290, 295) of surge elements or one or more of the surge elements (291, 292, 293, 294, 295, 296, 297, 298) may not be needed, for example if surge protection is only needed on one of an input end or an output end of a network. An alternative implementation may utilize additional ATAC filters in parallel with any of the first ATAC filter 260, the second ATAC filter 265, the third ATAC filter 270, the fourth ATAC filter 275, the fifth ATAC filter 280 or the sixth ATAC filter 285 to further reduce the let through voltage. Similar to the previous discussion for FIG. 2A, such additional ATAC filters may allow for surge protection at a lower cost, particularly for systems or equipment operating at higher voltage or current levels.

The surge protection circuits 200 or 250 described above may be modified or alternately designed with differing circuit element values or with different, additional, or fewer circuit elements to achieve the same or similar functionality. The surge protection circuits 200 or 250 may be designed with components to facilitate AC functionality or DC functionality. The surge protection circuits 200 or 250 may also be scaled for an application having any desired voltage or current operating levels. As such, the surge protection circuits 200 or 250 may be configured for ranges of typical or commonly expected surge levels or may be designed and constructed as a custom configuration to meet the requirements of a particular system or setup.

The circuit elements of the surge protection circuits 200 or 250 may be discrete elements positioned within an enclosure or housing and/or may be mounted or electrically connected with a printed circuit board. An enclosure used may have input and/or output ports for allowing user-installation of the circuit to their own systems or equipment. In certain implementations, the enclosure may be a connector, the various circuit elements integrated within the connector.

Figure 3A:
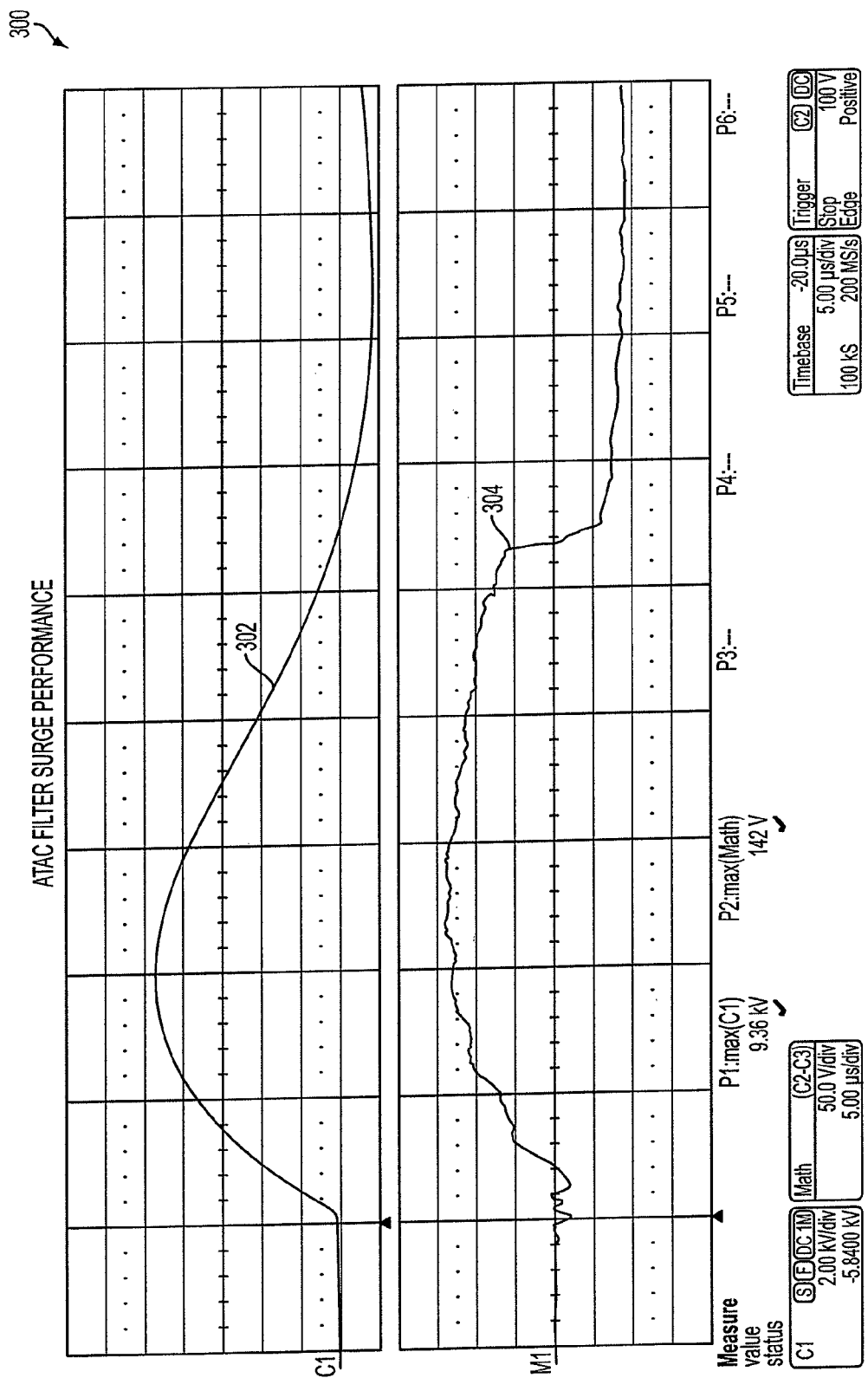
FIG. 3A is a plot of the current through an ATAC filter and the voltage let-through of the ATAC filter in accordance with an embodiment of the present invention.

Turning now to FIGS. 3A-3D, plots of the current and voltage let through are shown for a variety of surge suppression or protection devices. FIGS. 3A-3D depict 10 KA 8/20 µs surge performances. In FIG. 3A, the plot 300 demonstrates the current and voltage characteristics for an ATAC filter (e.g., the current flowing through the ATAC filter.) As will be seen in later described plots for FIGS. 3B-3D, the current waveform remains similar between the plots to facilitate a comparison of let through voltages for various surge protection techniques. Signal 304 shows a waveform of a let through voltage that propagates past the ATAC filter upon the current signal 302 flowing through the ATAC filter. As can be seen, the signal 304 has a peak voltage of only 142 volts.

Figure 3B:
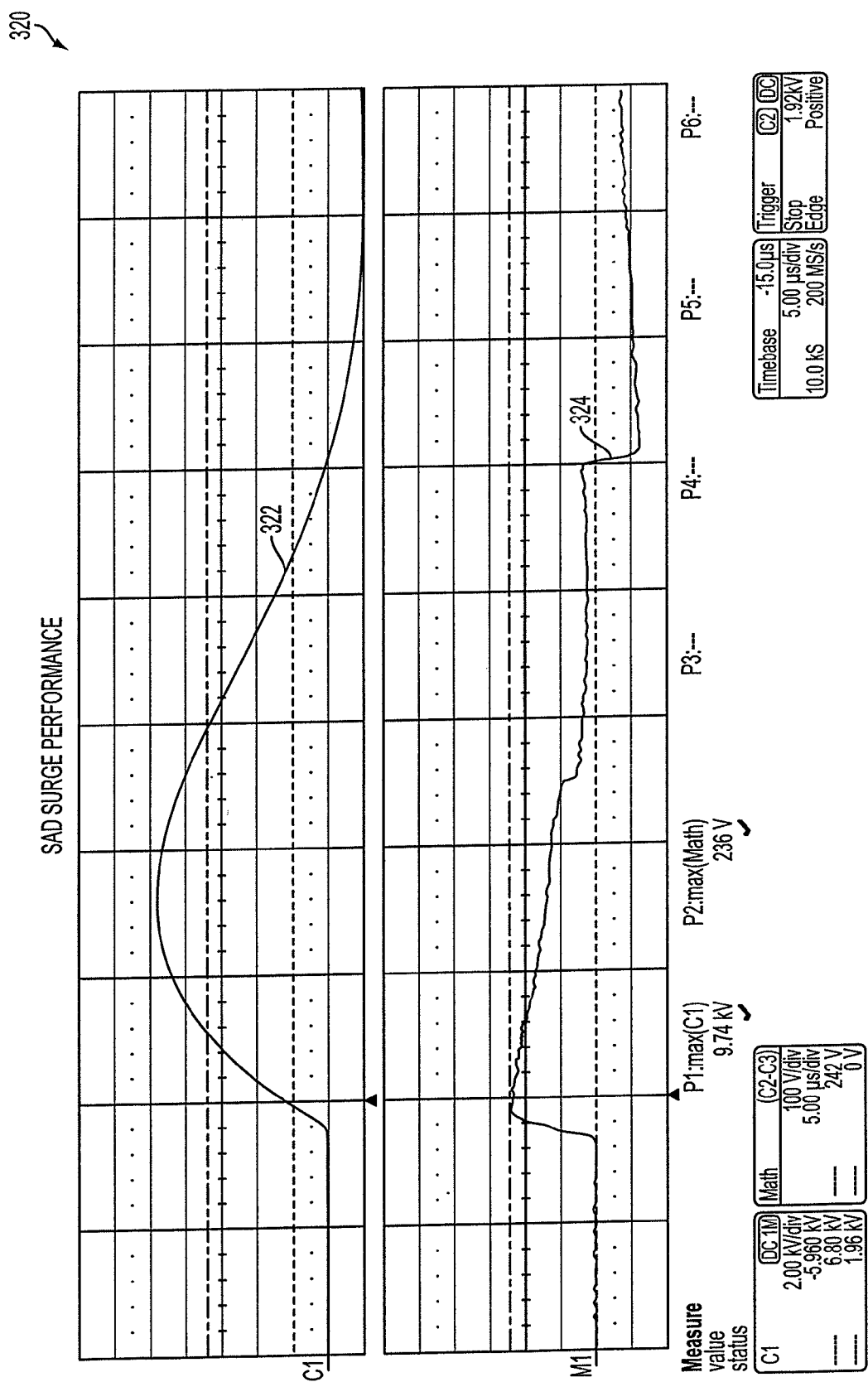
FIG. 3B is a plot of the current through a Silicon Avalanche Diode (SAD) and the voltage let-through of the SAD in accordance with an embodiment of the present invention.

FIG. 3B shows a plot 320 of current and voltage let through, similar to FIG. 3A, but instead utilizing a conventional SAD surge protection element without any ATAC filtering. The signal 322, representing a current flowing through the SAD is similar to the signal 302 for FIG. 3A. However, the signal 324, representing the voltage let through of the SAD upon the current signal 322 flowing through the SAD, is a significantly higher voltage level of 236 volts. Thus, for similar current values, the ATAC filter response shown in FIG. 3A has resulted in roughly a 40% drop in peak surge voltage that is let through compared to a conventional SAD surge protection element.

Figure 3C:
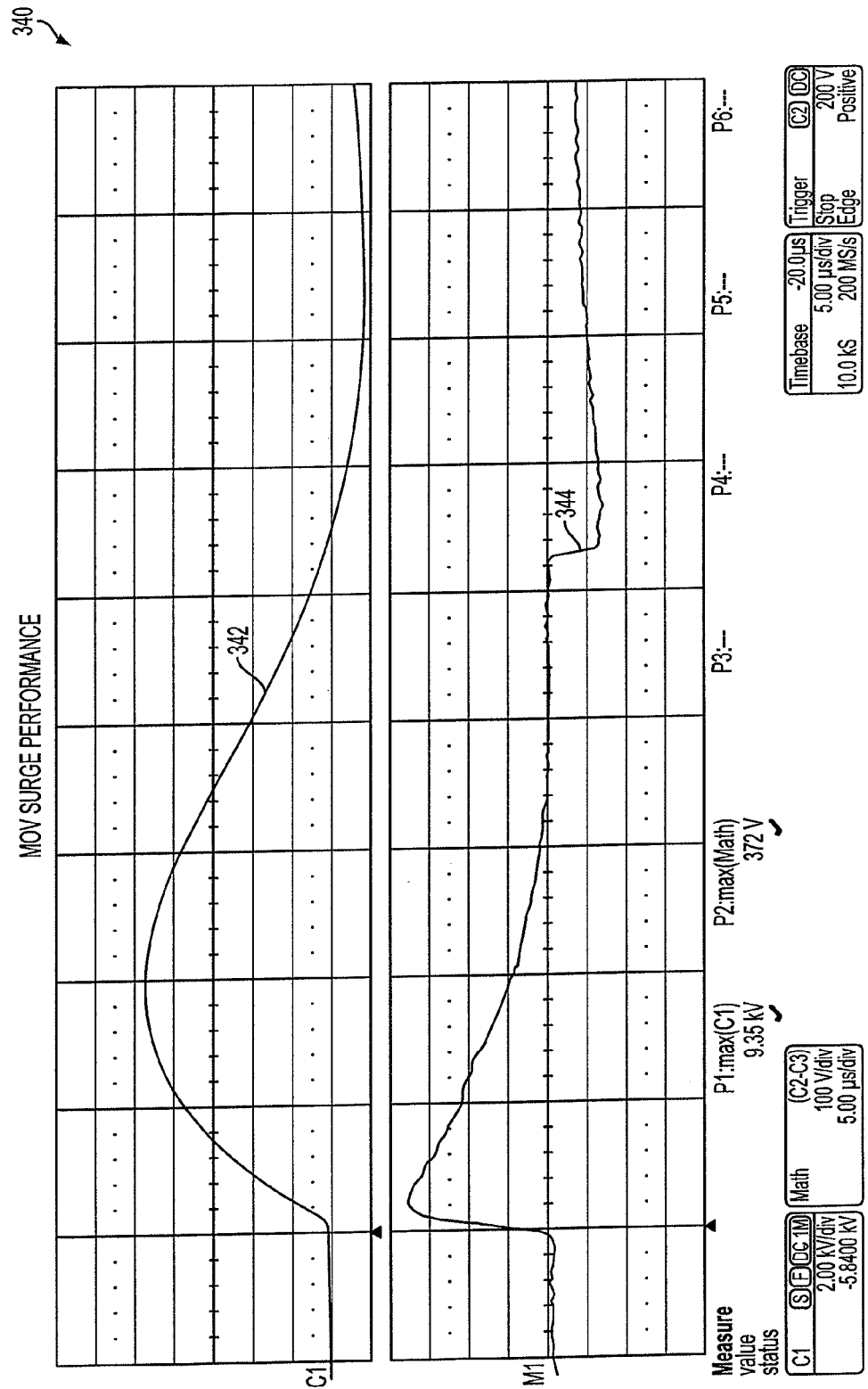
FIG. 3C is a plot of the current through a Metal Oxide Varistor (MOV) and the voltage let-through of the MOV in accordance with an embodiment of the present invention.

Similarly, FIG. 3C shows a plot 340 of current and voltage let through, but utilizing a conventional MOV surge protection element without any ATAC filtering. The signal 342, representing a current flowing through the MOV is again similar to the signal 302 for FIG. 3A. However, the signal 344, representing the voltage let through of the MOV upon the current signal 322 flowing through the MOV, is also a significantly higher voltage level of 372 volts. Thus, for similar current values, the ATAC filter response shown in FIG. 3A has resulted in roughly a 62% drop in peak surge voltage that is let through compared to a conventional MOV surge protection element.

Figure 3D:
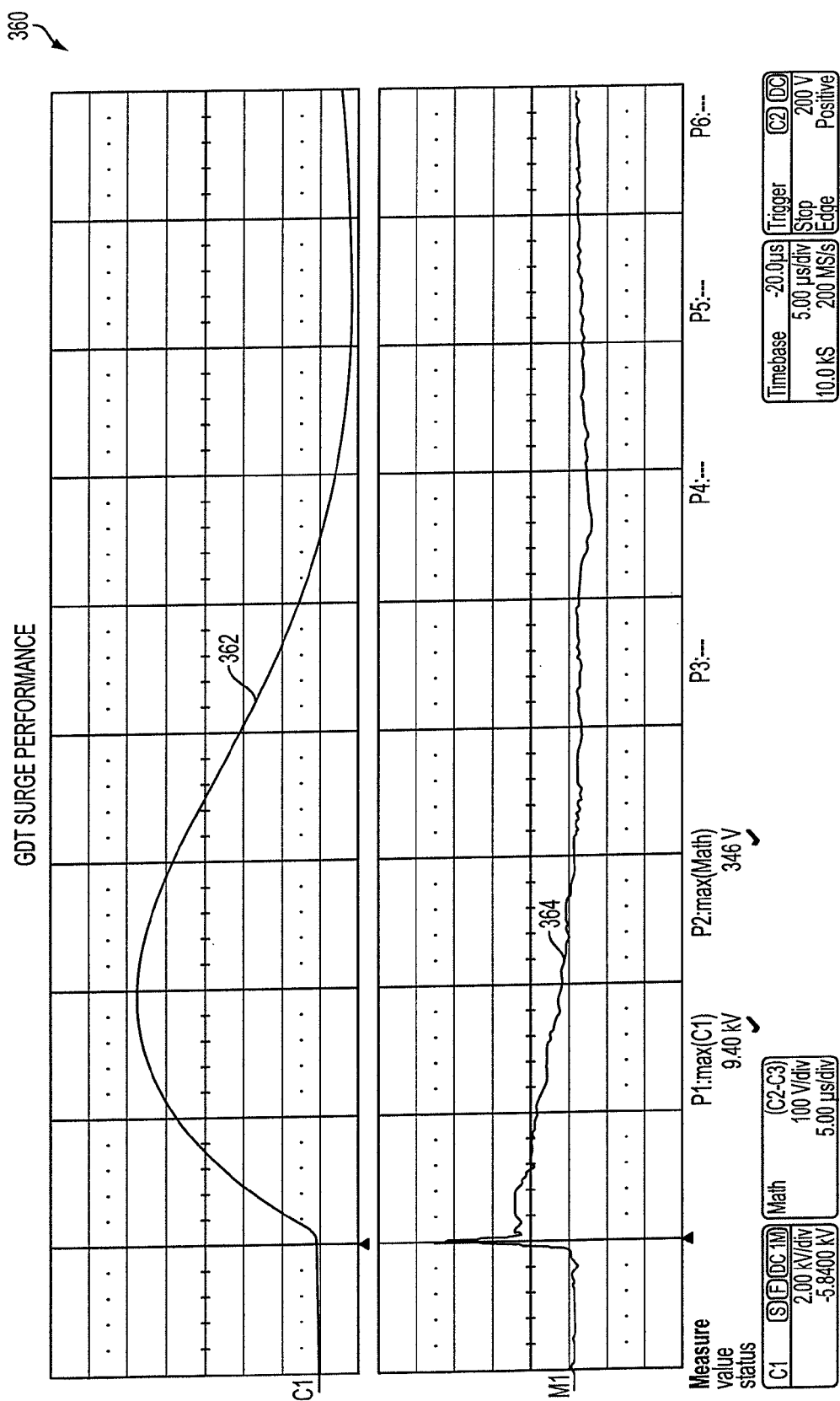
FIG. 3D is a plot of the current through a Gas Discharge Tube (GDT) and the voltage let-through of the GDT in accordance with an embodiment of the present invention.

Likewise, FIG. 3D shows a plot 360 of current and voltage let through, but utilizing a conventional GDT surge protection element without any ATAC filtering. The signal 362, representing a current flowing through the GDT is also similar to the signal 302 for FIG. 3A. However, the signal 364, representing the voltage let through of the GDT upon the current signal 362 flowing through the GDT, is again a significantly higher voltage level of 346 volts. Thus, for similar current values, the ATAC filter response shown in FIG. 3A has resulted in roughly a 59% drop in peak surge voltage that is let through compared to a conventional GDT surge protection element.

To lower the let through voltage, all surge elements must be in full conducting modes before the peak of the surge event. For an 8/20 µs waveform for instance, the current (di/dt) peak is at 8 µs. A GDT, for example, may not turn on fast enough to divert the surge current at the peak of the surge event to ground, resulting in a higher let through voltage. A GDT is slow in response time due to the gas ionization/excitation process. The GDT response time may be further increased because of the low potential voltage across its terminals when connected in parallel with another surge element. An ATAC filter has a faster response time.

Figure 4A:
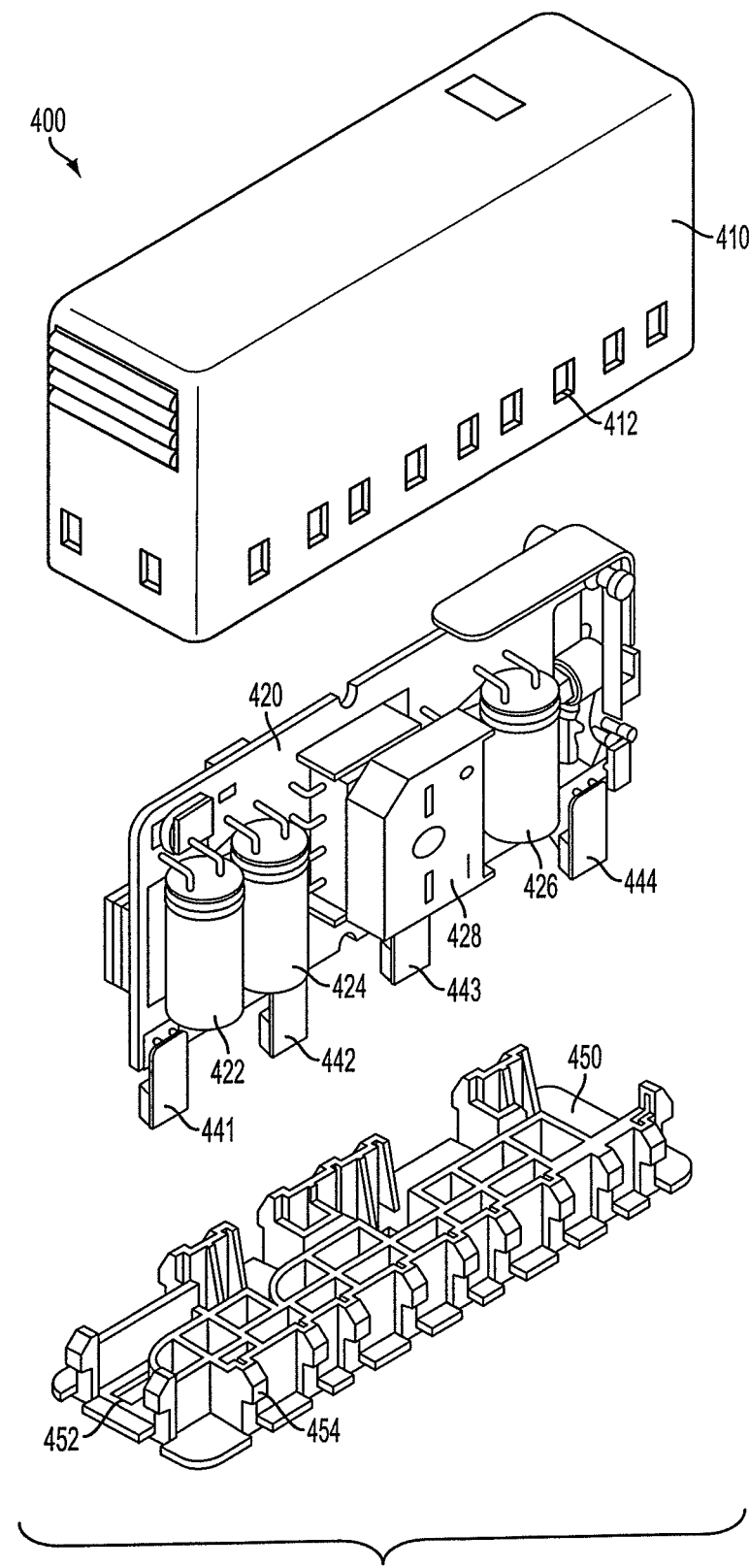
FIG. 4A is a disassembled front perspective view of a surge protection device incorporating an ATAC filter in accordance with an embodiment of the present invention.
Figure 4B:
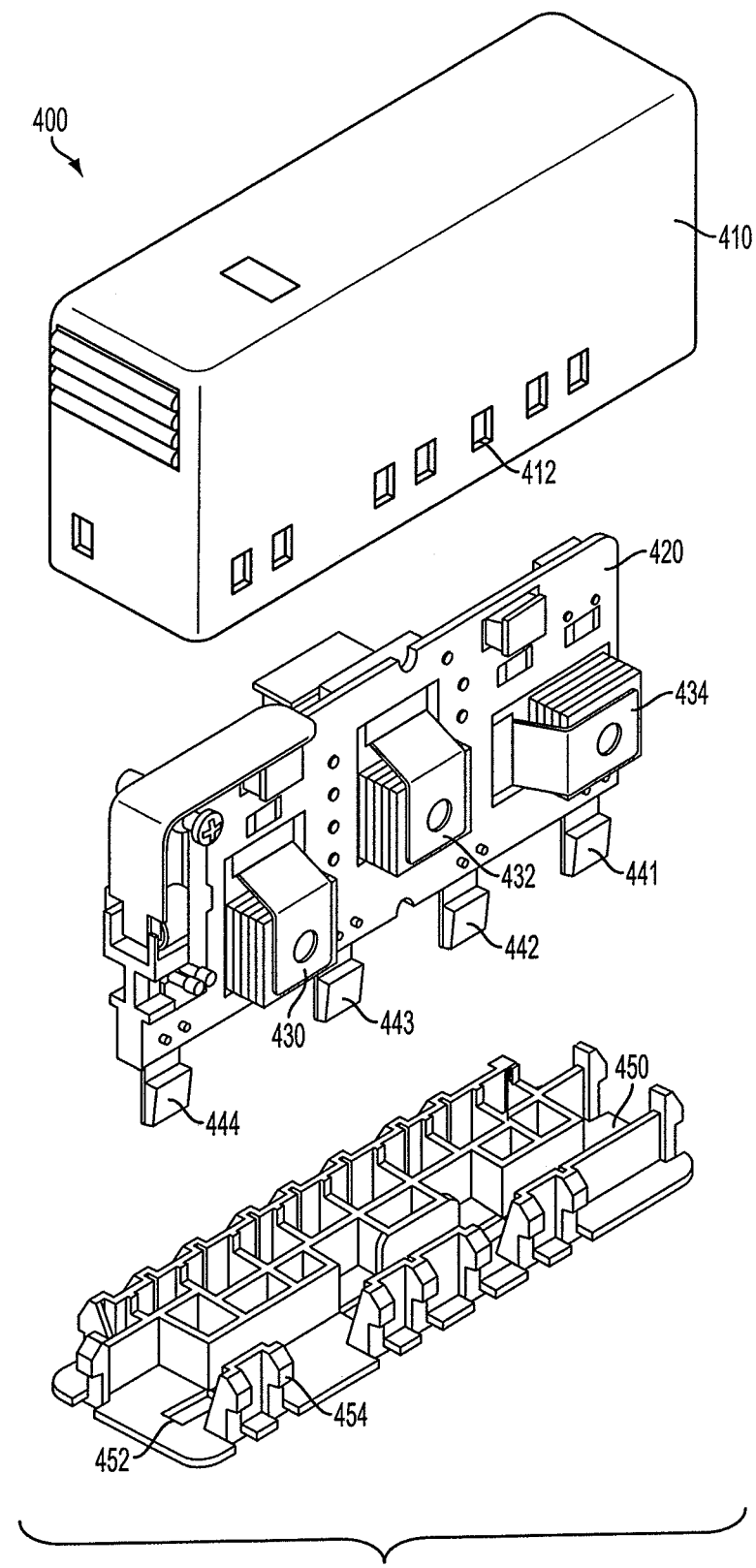
FIG. 4B is a disassembled rear perspective view of the surge protection device of FIG. 4A incorporating an ATAC filter in accordance with an embodiment of the present invention.

FIG. 4A shows a disassembled front perspective view of a surge protection device 400 incorporating an ATAC filter. Similarly, FIG. 4B shows a disassembled rear perspective view of the surge protection device 400 incorporating an ATAC filter. In certain implementations, the surge protection device 400 may be configured to accommodate any of a variety of surge protection circuits, for example the surge protection circuits described for FIG. 2A or 2B. With reference to both FIGS. 4A and 4B, the surge protection device 400 includes an enclosure cover 410 having a plurality of openings 412 for facilitating connection to a base, as described in greater detail herein. The enclosure cover 410 defines a cavity within for the placement of surge protection circuit elements, such as an ATAC filter.

A printed circuit board (PCB) 420 fits within the cavity of the enclosure cover 410 and has a first surface and a second surface substantially parallel to the first surface. The printed circuit board is connected to conductive connection terminals (441, 442, 443, 444). These connection terminals (441, 442, 443, 444) are protruding conductive contacts that may be plugged into corresponding receptacles of a mother board or other device for mating the surge protection device 400 with a user's system or other hardware. The connection terminals (441, 442, 443, 444) may be disposed along a plane on one side of the PCB 420. An alternative implementation may use greater or fewer connection terminals of the same or a different type and oriented in varying configurations. A plurality of capacitors (422, 424, 426) are connected to the first surface of the PCB 420 and are electrically connected, either directly or through other circuit elements, to one or more of the connection terminals (441, 442, 443, 444). In addition, a bridge rectifier element 428 is connected to the first surface of the PCB 420 for rectifying AC signals to DC.

On the second surface of the PCB 420, a plurality of SAD elements (430, 432, 434) are connected to the PCB 420. Electrical traces on the PCB 420 electrically connect certain of the SAD elements (430, 432, 434) to certain other circuit components on the PCB 420, such as the capacitors (422, 424, 426), the bridge rectifier element 428 or the connection terminals (441, 442, 443, 444). By electrically connecting one or more of the SAD elements (430, 432, 434) with the capacitors (422, 424, 426), one or more ATAC filters may be formed for lowering the let through voltage of a surge signal entering the surge protection device 400. A support base 450 is disposed adjacent to and contacting certain circuit elements or structural geometry of the PCB 420. The connection terminals (441, 442, 443, 444) of the PCB 420 extend through a plurality of slots 452 in the support base 450 to facilitate external connection of the surge protection device 400. The support base 450 includes a plurality of clips 454 disposed along a perimeter of the support base 450 that cooperate with the plurality of openings 412 of the cover enclosure 410 to form a secure and stable outer housing of the surge protection device 400. The various protrusions and recessions of the support base 450 operate to safely keep the PCB 420 in place when the surge protection device 400 is being manipulated by a user, for example when plugging in or removing the surge protection device 400 from a backplane or motherboard.

Exemplary implementations of this disclosure have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such implementations that reasonably fall within the scope of the advancement to the art hereby contributed, and that that scope shall not be restricted, except in light of the appended claims and their equivalents.

What is claimed is:

1. A surge protection device comprising:
    an advanced transient avalanche charger (ATAC) filter circuit including
        an input node;
        an output node;
        a capacitor;
        a resistor connected in parallel with the capacitor; and
        a diode having a first terminal connected to the input node and a second terminal connected in series with the capacitor and the resistor.

2. The device of claim 1 wherein the ATAC filter circuit further comprises a second SAD having a first terminal connected to the output node and a second terminal connected in series with the capacitor and the resistor.

3. The device of claim 1 wherein the ATAC filter circuit is connected in parallel with a surge element.

4. The device of claim 1 wherein the input node of ATAC filter circuit is connected to a first signal line and the output node of the ATAC filter circuit is connected to a second signal line.

5. The device of claim 1 wherein the input node of the ATAC filter circuit is connected to a signal line and the output node of the ATAC filter circuit is connected to a ground.

6. The device of claim 1 further comprising a first input port and a second input port, wherein the ATAC filter circuit is connected between the first input port and the second input port.

7. The device of claim 6 further comprising a surge element connected in parallel with the ATAC filter circuit.

8. A low let-through voltage surge suppression or protection apparatus comprising:
    a first signal port;
    a second signal port;
    a ground connection;
    a first surge protection filtering device electrically connected between the first signal port and the second signal port for reducing a let through voltage, the first surge protection filtering device including
        a first silicon avalanche diode (SAD),
        a first capacitor connected to the first SAD, and
        a first resistor connected to the first SAID and connected in parallel with the first capacitor;
    a first surge element electrically connected between the first signal port and the second signal port in parallel with the first surge protection filtering device;
    a second surge protection filtering device electrically connected between the first signal port and the ground connection for reducing a let through voltage, the second surge protection filtering device including
        a second SAD,
        a second capacitor connected to the second SAD, and
        a second resistor connected to the second SAD and connected in parallel with the second capacitor;
    a second surge element electrically connected between the first signal port and the ground connection in parallel with the second surge protection filtering device;
    a third surge protection filtering device electrically connected between the second signal port and the ground connection for reducing a let through voltage, the third surge protection filtering device including
        a third SAD,
        a third capacitor connected to the third SAD, and
        a third resistor connected to the third SAD and connected in parallel with the third capacitor; and
    a third surge element electrically connected between the second signal port and the ground connection in parallel with the third surge protection filtering device.

9. The low let-through voltage surge suppression or protection apparatus of claim 8 further comprising a housing defining a cavity therein, wherein the first signal port, second signal port, and ground connection are connected to the housing.

10. The low let-through voltage surge suppression or protection apparatus of claim 9 wherein the first, second and third surge protection filtering devices, and the first, second and third surge elements are located within the cavity.

11. The low let-through voltage surge suppression or protection apparatus of claim 8 wherein
    the first surge protection filtering device further includes a fourth SAD connected to the first resistor and the first capacitor,
    the second surge protection filtering device further includes a fifth SAD connected to the second resistor and the second capacitor, and
    the third surge protection filtering device further includes a sixth SAD connected to the third resistor and the third capacitor.

12. The low let-through voltage surge suppression or protection apparatus of claim 8 wherein the first surge element, the second surge element and/or the third surge element are selected from a group consisting of an SAD, a metal oxide varistor (MOV), and a gas discharge tube (GDT).

13. The low let-through voltage surge suppression or protection apparatus of claim 11 further comprising a fourth surge protection filtering device electrically connected in parallel with any of the first surge protection filtering device, the second surge protection filtering device or the third surge protection filtering device for further reducing a let through voltage, the fourth surge protection filtering device including
- a fourth SAD,
- a fourth capacitor connected to the fourth SAD, and
- a fourth resistor connected to the fourth SAD and connected in parallel with the fourth capacitor.

14. A low let-through voltage surge suppression or protection apparatus comprising:
- a first input port;
- a second input port;
- a first output port;
- a second output port;
- a first inductor electrically connected between the first input port and the first output port;
- a second inductor electrically connected between the second input port and the second output port;
- a ground port;
- a first surge protection filtering device electrically connected between the first input port and the second input port for reducing a let through voltage;
- a first surge element electrically connected between the first input port and the second input port in parallel with the first surge protection filtering device;
- a second surge protection filtering device electrically connected between the first input port and the ground port for reducing a let through voltage;
- a second surge element electrically connected between the first input port and the ground port in parallel with the second surge protection filtering device;
- a third surge protection filtering device electrically connected between the first output port and the ground port for reducing a let through voltage;
- a third surge element electrically connected between the first output port and the ground port in parallel with the third surge protection filtering device;
- a fourth surge protection filtering device electrically connected between the second input port and the ground port for reducing a let through voltage;
- a fourth surge element electrically connected between the second input port and the ground port in parallel with the fourth surge protection filtering device;
- a fifth surge protection filtering device electrically connected between the second output port and the ground port for reducing a let through voltage;
- a fifth surge element electrically connected between the second output port and the ground port in parallel with the fifth surge protection filtering device;
- a sixth surge protection filtering device electrically connected between the first output port and the second output port for reducing a let through voltage; and
- a sixth surge element electrically connected between the first output port and the second output port in parallel with the sixth surge protection filtering device.

15. The low let-through voltage surge suppression or protection apparatus of claim 14 wherein the first surge protection filtering device, the second surge protection filtering device, the third surge protection filtering device, the fourth surge protection filtering device, the fifth surge protection filtering device and the sixth surge protection filtering device each include
- a silicon avalanche diode (SAD),
- a capacitor connected to the SAD, and
- a resistor connected to the SAD and connected in parallel with the capacitor.

16. The low let-through voltage surge suppression or protection apparatus of claim 14 wherein the first surge protection filtering device, the second surge protection filtering device, the third surge protection filtering device, the fourth surge protection filtering device, the fifth surge protection filtering device and the sixth surge protection filtering device each include
- a first silicon avalanche diode (SAD),
- a capacitor connected to the SAD,
- a resistor connected to the SAD and connected in parallel with the capacitor, and
- a second SAD connected to the capacitor and the resistor.

17. The low let-through voltage surge suppression or protection apparatus of claim 15 wherein the first surge element, the second surge element, the third surge element, the fourth surge element, the fifth surge element and/or the sixth surge element are selected from a group consisting of a silicon avalanche diode (SAD), a metal oxide varistor (MOV), and a gas discharge tube (GDT).

18. The low let-through voltage surge suppression or protection apparatus of claim 15 further comprising a seventh surge protection filtering device electrically connected in parallel with any of the first surge protection filtering device, the second surge protection filtering device, the third surge protection filtering device, the fourth surge protection filtering device, the fifth surge protection filtering device or the sixth surge protection filtering device for further reducing a let through voltage, the seventh surge protection filtering device including
- a second silicon avalanche diode (SAD),
- a second capacitor connected to the second SAD, and
- a second resistor connected to the second SAD and connected in parallel with the second capacitor.

19. The low let-through voltage surge suppression or protection apparatus of claim 14 further comprising a printed circuit board (PCB), wherein the first and second inductors, the first, second, third, fourth, fifth, and sixth surge protection filtering devices, and the first, second, third, fourth, fifth, and sixth surge elements are disposed on the PCB.

20. The low let-through voltage surge suppression or protection apparatus of claim 19, further comprising a housing defining a cavity therein, wherein the first and second input ports and the first and second output ports are connected to the housing, and the PCB is housed within the cavity.

* * * * *